Patented Dec. 15, 1931

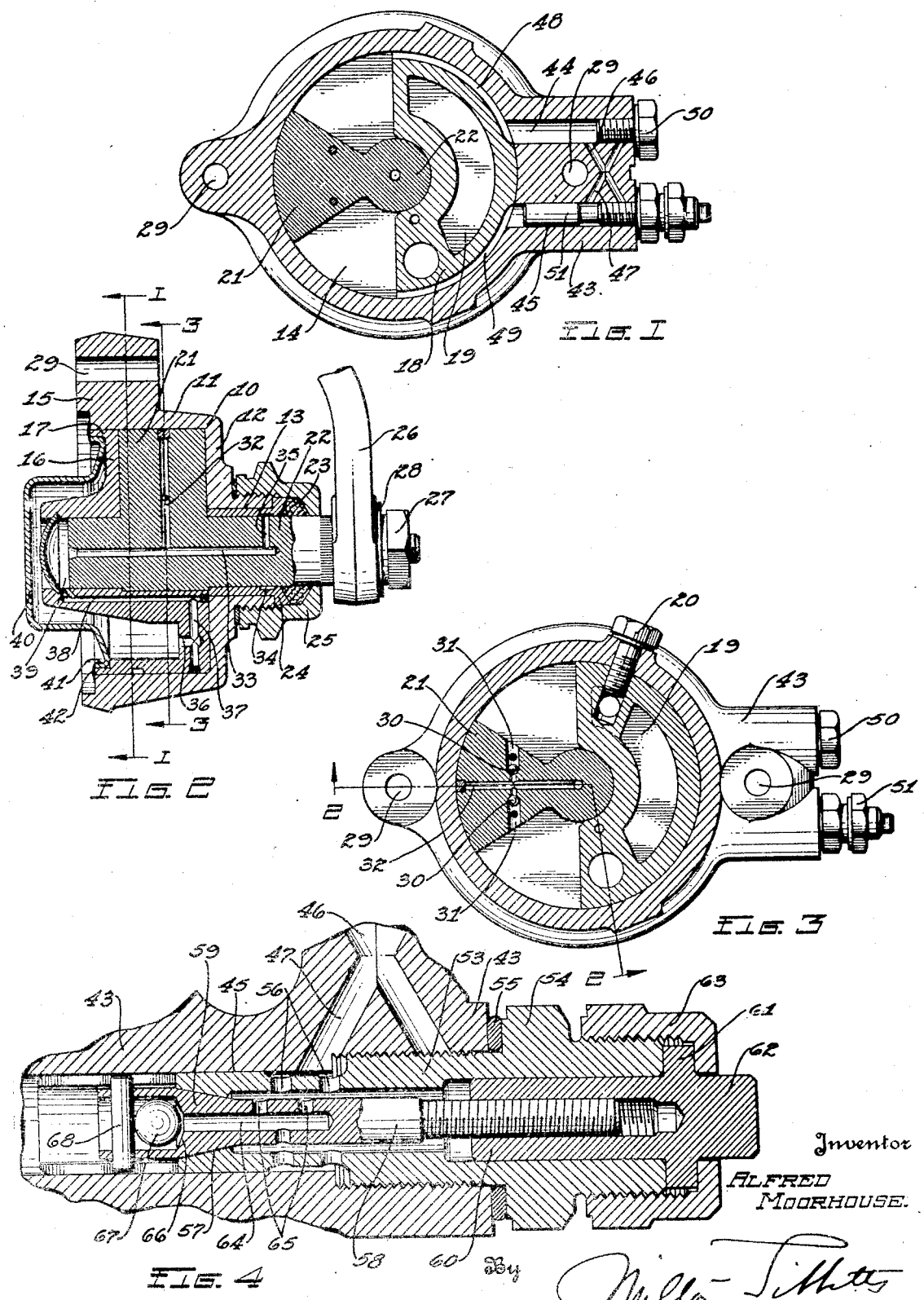

1,836,933

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

HYDRAULIC SHOCK ABSORBER

Application filed August 9, 1929. Serial No. 384,744.

This invention relates to hydraulic shock absorbers, and more particularly to metering devices for regulating the displacement of liquid from one portion of the working chamber to another by the piston.

The fluid generally used in such shock absorbers is oil or glycerine, the viscosity of which varies in accordance with prevailing temperatures, and therefore it becomes desirable to adjust the metering device in order to regulate the fluid flow in order to obtain a uniform resistance to the piston movement in the working chamber at all times.

It is an object of this invention to provide a shock absorber with a metering device which is responsive to temperature for regulating the flow of liquid by-passed from one portion of the working chamber to another portion thereof by the piston movement.

Another object of the invention is to provide a metering device for hydraulic shock absorbers which is composed of elements having different co-efficients of expansion associated to automatically regulate fluid flow in accordance with temperature so that a constant resistance is offered to the piston movement.

A further object of the invention is to provide a metering device for hydraulic shock absorbers in which elements having different co-efficients of expansion are axially adjusted relatively by temperature to effect a uniform resistance to the piston movement.

Still another object of the invention is to provide a manually adjustable metering device for shock absorbers which after being set will be automatically responsive to temperature to maintain a uniform piston resistance.

Other objects of the invention will appear from the following description taken in connection with the accompanying drawings which form a part of this specification, and in which:

Fig. 1 is a vertical sectional view of a shock absorber, taken on line 1—1 of Fig. 2, with which my invention is associated;

Fig. 2 is a sectional view of the same taken on line 2—2 of Fig. 3;

Fig. 3 is a vertical sectional view of the shock absorber taken on line 3—3 of Fig. 2, and Fig. 4 is a medial sectional view of the metering device associated with a fragmentary portion of the shock absorber.

Referring to the drawings, 10 is the body or casing of the shock absorber having a cylindrical portion 11, an end wall 12 and a bearing portion 13. The cylindrical portion and end wall form a fluid containing working chamber 14 for the shock absorber, and the cylindrical portion 11 is provided with an annular end portion 15 for a purpose presently to appear.

An inner cover or closure 16 is inserted in the open end of the casing and is provided with an annular flange 17 adapted to be positioned contiguous to the end portion 15 of the casing. The cover or closure 16 has a semi-cylindrical extension 18 fitting into the cylindrical portion 11 of the casing, the extension being preferably cored out to form an auxiliary reservoir or reserve tank 19. A filling opening is provided by aligned passages in the casing and the extension 18, and is closed by a plug 20. Both the working chamber and reservoir are substantially filled with any suitable liquid such as oil, glycerine or a fluid having similar characteristics.

A vane piston 21, mounted to oscillate in the working chamber 14, has a shaft 22 suitably supported in the casing and cover. The packing 23 is compressed against the bearing sleeve 24 by a hollow nut 25 screwed on the bearing portion 13 of the casing. Outwardly of nut 25, shaft 22 is serrated and an arm 26 is mounted upon the serrated portion and held thereon by nut 27 and lock washer 28. The shock absorber is adapted to be mounted upon a suitable support by bolts extending through openings 29 in the casing. Arm 26 is adapted for connection in any suitable manner to a part which moves relative to the support upon which the absorber is mounted so that the piston will be operated in the working chamber as the vehicle parts move relative to each other. Piston 21 is provided with a pair of check valves 30 arranged in passages 31 which communicate with a passage 32 which in turn connects with a passage 33 in shaft 22. An annular leakage groove 34 is formed in bearing sleeve 24 and a short passage 35 connects this leakage groove with passage 33. Any liquid escaping from the working chamber in the direction of the bearing sleeve 24 will be caught in the leakage groove 34 and drawn back into the working chamber through passages 35, 33, 32, and 31, and past check valves 30 by reason of the suction existing on the receiving side of the piston. Liquid may be drawn into the working chamber from the lowermost part of the auxiliary reservoir 19, when needed, through connected passages 36, 37, 38, 39, 33, 32, and 31 and past check valves 30.

An outer cover in the form of a plate 40 having an annular flange 41 pressed into a cylindrical portion of the inner cover 16 formed by the annular flange 17 provides an enlargement of reservoir 19. As may be seen in Fig. 4 of the drawings, flange 41 of the outer cover and flange 17 of the inner cover are adapted to be positioned contiguously.

The flange ends 17 and 41 of the cover members are arranged to lie adjacent the edge portion 15 of the casing and are welded together as shown at 42 thereby providing an integral structure which is hermetically sealed at such joints. The packing 23, at the other end of the casing, also provides a seal so that the interior of the assembled casing is hermetically sealed.

The shock absorber casing is provided with a projecting boss 43 having spaced passages 44 and 45 arranged with their axes parallel and substantially normal to the axis of shaft 22. The passages 44 and 45 are connected near the outer end of the boss 43 by means of intersecting passages 46 and 47, and passage 44 is connected with the working chamber 14 of the shock absorber on one side of the piston by means of an arcuate groove 48 in the periphery of the cylindrical portion of the extension 18, and passage 45 is similarly connected with the working chamber on the opposite side of piston 21 by means of an arcuate groove 49 in the periphery of the extension 18. The outer end of the passage 44 is closed by a plug member 50, and a metering device 51 extends into and plugs the outer end of the passage 45.

The groove 48 and the casing adjacent thereto, the passage 44, the passages 46 and 47, the passage 45 and the groove 49 provide duct means within the casing through which liquid can be moved from one portion of the working chamber to another on opposite sides of the piston. The oscillating piston 21 in moving toward either of the arcuate grooves 48 or 49 will compress the fluid within the chamber between it and the extension 18 and force a portion of the fluid through the duct means and metering device into the fluid working chamber on the opposite side of the piston. The restriction to such flow of fluid determines the resistance to the piston movement, and obviously by regulating such restriction and the consequent flow, varied riding conditions can be obtained.

In order to regulate the flow of liquid in the shock absorber from one side of the piston to the other, I provide the metering device 51 which can be bodily inserted into operative position in the casing and also bodily removed therefrom, and which can also be adjusted from the exterior of the casing when installed. Further, the device is arranged with independent dual ducts, one of which can be adjusted to allow a similar varied flow in either direction, while the other duct will permit flow in only one direction. To receive the metering device, the outer end of the passage 45 is slightly enlarged and the outer portion of the interior wall is threaded. A hollow cylindrical casing or plug valve member 53, threaded externally, is screwed into the outer end of the passage 45 until a shoulder portion 54 compresses a gasket or packing 55 tightly against the end of the boss 43. The inner end of the casing fits closely in the passage 45 and is provided with a reduced intermediate portion provided with ducts 56 therethrough, such ducts being arranged in open communication with the passage 47. The inner end of the casing is provided with a conical opening providing a valve seat 57, while the opposite end extending exteriorly of the casing is open and threaded externally.

Valve mechanism is associated with the casing 53, and includes a rod 58 having a threaded bearing end, whereby adjustment can be made, and a conical valve head end 59. The valve rod extends through the inner end of the hollow casing and screws into the adjustment and bearing member 60 which plugs the outer open end of the casing. The adjustment member is provided with a flange 61 which engages the outer end of the casing, while the portion 62 extending beyond the flange 61 is formed to provide faces for the engagement of a tool when adjustment of the valve is to be made. A nut 63 screws upon the threaded end of the casing and is formed to clamp the flange of the valve rod against the casing to prevent rotation thereof. By screwing the adjustment member to the right or left, when the lock nut 63 is unscrewed, the valve rod will be reciprocated axially so that the conical valve head will move toward or away from the seat 57 in the casing, and in this manner the restriction to flow between the passages 45 and 47 can be manually regulated as desired. It will be understood that when this valve is adjusted in desired position the same quantity of fluid can pass thereby in either direction.

The valve rod is utilized to provide a second duct means through which fluid can pass from the passage 47 to the open end of the passage 45, independently of the conical valve duct means. The end portion of the valve rod is formed with an axially extending passage 64 which terminates adjacent the ducts 56 in the casing and extends through the inner end thereof, such passage communicates with the portion of the casing open to the passage 47 through ducts 65. A valve seat 66 is formed interiorly of the valve rod, and a ball valve 67 is associated therewith. A pin 68 extending through the inner end of the valve rod permits only a limited movement of the ball valve. It will be seen that fluid can pass through the passage 64 to the passage 45, but there will be no flow of the fluid from the passage 45 through the passage 64 due to the ball seating, and thus there will be less resistance in the working chamber on the deflection movement of the piston than during rebound movement. Adjustment of the valve 59 will in no way alter the functioning of the one way duct means.

The various elements constituting the metering device, with the exception of the lock nut 63, are associated so that the resulting structure is a unit which can be bodily positioned in the absorber or detached therefrom. Pressure relief in the working chamber can be readily varied from the exterior of the absorber, so that different riding qualities can be provided for varying temperatures and driving conditions.

The metering device above described is also adapted to be responsive to temperature so that the passage between the valve members 57 and 59 will be automatically regulated to permit a flow which regardless of viscosity will result in a uniform resistance being offered to the piston movement at any setting. In order to accomplish this desirable condition, I form the elements 53 and 58 of materials having different co-efficients of expansion, the element 53 having the greater co-efficient of expansion. Specifically, I form the valve element 53 of aluminum, or an alloy thereof, while I form the element 58 of steel. It is evident that the axial expansion and contraction of these two elements, in response to temperature conditions, will automatically regulate the area of the passage between the valve portions 59 and 57 and thereby control the flow of the fluid between the passage 47 and 49 in both directions depending upon the piston movement.

It will be seen that after the manual adjustment of the metering device has been made to a desired flow or resistance condition, there will be no further need for adjustment due to temperature changes because this will be compensated for automatically.

While a specific embodiment of the invention has been herein described, which is deemed to be new and advantageous and may be specifically claimed, it is not to be understood that the invention in limited to the exact details of the construction, as it will be apparent that changes may be made therein without departing from the spirit or scope of the invention.

What I claim is:

1. In a hydraulic shock absorber, a liquid containing casing providing a chamber, a piston oscillating in the chamber, said casing having a duct therein connecting portions of the chamber on opposite sides of the piston, and a metering device in said duct comprising a pair of movable valve elements formed of metal having different co-efficients of expansion.

2. In a hydraulic shock absorber, a liquid containing casing providing a chamber, a piston oscillating in the chamber, said casing having a duct therein connecting portions of the chamber on opposite sides of the piston, and a metering device comprising a pair of telescopically related and axially movable valve elements having different co-efficients of expansion.

3. In a hydraulic shock absorber, a liquid containing casing providing a chamber, a piston oscillating in the chamber, said casing having a duct therein connecting portions of the chamber on opposite sides of the piston, and a metering device comprising a plug element secured in said duct, said plug element having a passage therethrough, and a valve element extending through the passage in said plug element, said valve element being formed of material having a lower co-efficient of expansion than that of said plug element.

4. In a hydraulic shock absorber, a liquid containing casing providing a chamber, a piston oscillating in the chamber, said casing having a duct therein connecting portions of the chamber on opposite sides of the piston, and a metering device comprising a plug element secured in said duct, said plug element having a passage therethrough tapered at one end, and a tapered valve element secured in spaced relation within the tapered passage, said valve element being formed of material having a lower co-efficient of expansion than that of said plug element.

5. In a hydraulic shock absorber, a liquid containing casing providing a chamber, a piston oscillating in the chamber, said casing having a duct therein connecting portions of the chamber, on opposite sides of the piston, and a metering device comprising a two-part valve, said parts being formed entirely of metal having different co-efficients of expansion.

6. In a hydraulic shock absorber, a liquid containing casing providing a chamber, a piston oscillating in the chamber, said casing having a duct therein connecting portions of the chamber on opposite sides of the piston, and a metering device comprising two axially adjustable valve elements for controlling the flow of fluid through said duct, said elements having different co-efficients of expansion.

7. In a hydraulic shock absorber, a liquid containing casing providing a chamber, a piston oscillating in the chamber, said casing having a duct therein connecting portions of the chamber on opposite sides of the piston, and a metering device in said duct, said metering device comprising a pair of axially movable elements formed of metal having different co-efficients of expansion and adapted to be fixed in related position through manual adjustment, the relation of said valve elements determining the flow of liquid through the duct and the resistance to the oscillation of the piston.

In testimony whereof I affix my signature.

ALFRED MOORHOUSE.